United States Patent
Lee

(10) Patent No.: US 8,145,977 B2
(45) Date of Patent: Mar. 27, 2012

(54) METHODS AND APPARATUS FOR PROVIDING ERROR CORRECTION TO UNWRITTEN PAGES AND FOR IDENTIFYING UNWRITTEN PAGES IN FLASH MEMORY

(76) Inventor: Joseph Schweiray Lee, San Diego, CA (US)

( * ) Notice: Subject to any disclaimer, the term of this patent is extended or adjusted under 35 U.S.C. 154(b) by 847 days.

(21) Appl. No.: 12/207,507

(22) Filed: Sep. 10, 2008

(65) Prior Publication Data

US 2009/0100315 A1    Apr. 16, 2009

Related U.S. Application Data

(60) Provisional application No. 60/998,800, filed on Oct. 15, 2007, provisional application No. 61/085,858, filed on Aug. 3, 2008.

(51) Int. Cl.
*G11C 29/00* (2006.01)

(52) U.S. Cl. ......... 714/763; 714/768; 714/758; 714/801

(58) Field of Classification Search ........................ None
See application file for complete search history.

(56) References Cited

U.S. PATENT DOCUMENTS

| | | | | |
|---|---|---|---|---|
| 5,428,630 | A * | 6/1995 | Weng et al. | 714/763 |
| 7,783,955 | B2 * | 8/2010 | Murin | 714/763 |
| 2004/0255225 | A1 * | 12/2004 | Takai | 714/763 |
| 2006/0076418 | A1 * | 4/2006 | Ostertun et al. | 235/492 |

* cited by examiner

*Primary Examiner* — John Trimmings

(57) ABSTRACT

Provided are methods for error correction coding (ECC) for flash memory pages which have been erased but have not been programmed. In one method, each ECC code word is bitwise inverted before being programmed into a page, and bitwise inverted again after being read back from the page before entering the decoder. Thus an unwritten page, whose bits are all ones when random errors are absent, appears to the decoder as all zeros, which form a valid code word(s) in linear block codes. In another method, in both page programming and page read, the parity section of each ECC code word is bitwise XORed with the complement of a parity calculated from a message whose bits are all ones. Thus an unwritten page appears to the decoder as a valid ECC code word(s) when random errors are absent. Further provided is an apparatus for determining after a page read whether or not the read page has been programmed by comparing the number of read code word symbols which do not have the default erased value and the maximum number of symbol errors correctable by the ECC.

8 Claims, 9 Drawing Sheets

METHODS AND APPARATUS FOR PROVIDING ERROR CORRECTION TO UNWRITTEN PAGES AND FOR IDENTIFYING UNWRITTEN PAGES IN FLASH MEMORY

PRIORITY APPLICATION

This application claims the benefit under 35 U.S.C. 119(e) of U.S. Provisional Application 60/998,800 (filed Oct. 15, 2007) and U.S. Provisional Application 61/085,858 (filed Aug. 3, 2008). The entire disclosure of this application is hereby incorporated by reference herein.

COPYRIGHT RIGHTS

A portion of the disclosure of this patent document contains material that is subject to copyright protection. The copyright owner has no objection to the facsimile reproduction by any one of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates generally to error correction coding for data storage systems such as the flash memory.

2. Description of the Related Art

Many flash memories have a page-accessible interface, which means that the flash array therein is arranged into "pages", which is a unit for host data access, and that the host transfers data to and from the flash memory one page at a time. Other than pages, the flash array is further arranged in "blocks", which is a unit for data erasure. When activated by the host, the flash memory performs an "erase" operation which forces all bits in a specified block to a default value, which is '1' (one) in most flash memories. Usually, the block is a larger unit than the page and contains a plurality of pages. For the host to write new data to an already written page, the block containing the page would be erased before the page can be written with new data. If the host writes only portions of a page, then all bits in the unwritten portions of the page would retain the default value. In the present invention, "writing a page" refers to the operation of the host sending data to the flash memory and the flash memory programming the data into the flash array of a specified page. Therefore, the terms "programming a page" and "writing a page" are used interchangeably. An "unwritten page" refers to a page which has been erased but has not been written with host data. The term "default value" refers to the value of a data unit, such as a bit or a symbol, in an unwritten page. As an example, the default value of a bit is one in the present invention, which may be easily modified for a default value of zero. Further, the present invention uses the flash memory as an example of the data storage medium in the host system, it is obvious to those skilled in the art that the principles of the present invention apply to any data storage medium which, when unwritten, has a uniform default value.

Error correction codes (ECC) are often used with flash memories to protect the integrity of the data stored in the storage medium against data-corrupting conditions such as storage medium defects, random read errors, etc. Linear block codes are a class of error correction codes which is often used and is the focus of the present invention.

A "symbol" refers to a data unit of a fixed number of bits. Symbols of m bits can be uniquely represented by elements of a Galois Field (or GF) of order $2^m$. Once a particular GF is selected to represent the symbols, then the arithmetic operations between any two symbols are defined by the GF. In the vector representation, each GF element is represented by a vector of m bits, and the GF addition and subtraction operations between any two elements are equivalent to bitwise exclusive OR (XOR) of their corresponding vectors. In the present invention, an addition operation, indicated as a plus sign '+' in the drawings, between two symbols or between two sequences of symbols refers to bitwise XOR between two symbols or two sequences of symbols, respectively.

Encoding of an (n, k) linear block code means mapping a sequence of k message symbols into another sequence of n symbols, where n is greater than k. The resultant sequence of n symbols is commonly referred to as the "code word". Encoding methods are generally divided into two categories, namely the systematic and the non-systematic encoding. With systematic encoding, the message appears in the code word itself, occupying the first k symbols of the code word. The other n-k redundant symbols are commonly referred to as the "parity symbols" or "parity". On the other hand, with non-systematic encoding, the message does not necessarily appear in its corresponding code word.

FIG. 1 illustrates a generalized ECC scheme in a host system (101) using the flash memory as storage medium. The flash memory interface (106) sends and receives signals to and from the flash memory to operate the flash memory according to the interface protocol of the flash memory. In a flash memory write, the data source (102) outputs data in the form of "messages" to the Encoder (104) which encodes each message into a code word. The code words are sent to the flash memory interface which writes the code words to the flash memory (107). In a flash memory read, the flash memory interface (106) reads from the flash memory the code words stored therein and sends the read code words to the Decoder (105). The Decoder recovers the message from each read code word and sends the recovered message to the data destination (103). Due to the data corrupting conditions in the flash memory, a code word read from the flash memory may contain errors.

FIG. 2 illustrates the systematic and the non-systematic encoding from a mathematical viewpoint. Let polynomials M(X), p(X) and C(X) represent the k-symbol message, the (n-k)-symbol parity and the corresponding n-symbol code word, respectively. With systematic encoding, the encoder (201) takes M(X) (202) as input and computes p(X) (204) and appends p(X) to $X^{n-k}M(X)$ (203) to form the code word $C(X)=X^{n-k}M(X)+p(X)$. Multiplying M(X) by $X^{n-k}$ is equivalent to shifting M(X) left by n-k symbols. With non-systematic encoding, the encoder (205) takes M(X) (206) as input and computes C(X) (207) directly.

In some applications, the host may read from an unwritten page. If the host has prior knowledge that the page to be read is unwritten and thus does not contain a valid ECC code word, then the host can disable the ECC decoder while reading the page. However, random bit errors can occur while the host reads the page and can not be detected or corrected with the ECC decoder disabled. If the host does not have prior knowledge that the page to be read is unwritten and thus does not disable the ECC decoder while reading the page, then since the page has not been written with valid code words, the decoder would perform erroneous corrections to the page data even if the page is read without any random bit errors. Therefore, it would be advantageous to devise an ECC scheme whereby data in an unwritten page, as with written pages, is under the protection of ECC when read by the host, such that the host may read any page without prior knowledge as to whether the page has been written and without disabling the ECC decoder for the page read.

Since with such an ECC scheme, the host is not required to distinguish the written pages from the unwritten pages, it would be advantageous to devise an apparatus which is capable of determining whether or not a page is unwritten after the page is read from the flash memory. Obviously, for the apparatus to work properly, it is important that the unwritten pages be under the protection of the ECC such that the probability of random bit errors adversely affecting the result reported by the apparatus is minimized.

SUMMARY OF THE INVENTION

For providing ECC protection over unwritten pages, two embodiments of an ECC scheme are presented in the present invention. In the first embodiment, either a systematic encoder or a nonsystematic encoder may be used in the ECC scheme. When the host writes to a flash memory page, the code word output by the encoder is bitwise inverted as it is sent to the flash memory. When the host reads from the page, the code word is bitwise inverted again as it enters the decoder. In the second embodiment, a systematic encoder is used such that each code word consists of a message section and a parity section, whereby the parity is computed by the encoder using the message as input. Once the linear block code for the ECC is specified, the parity for a particular message is specified and can be pre-computed. A parity based on a message all of whose bits are one is pre-computed and is referred to as the "Default Parity". The bitwise logic complement of the Default Parity is referred to as the "Default Parity Complement". In a page write, as each code word is sent to the flash memory, the parity section of the code word is bitwise XORed with the Default Parity Complement. In a page read, the parity section of each read code word is again bitwise XORed with the Default Parity Complement before entering the decoder.

For determining whether a read page is unwritten, an exemplary apparatus is presented as a part of the present invention. In each page read, the apparatus counts the number of read code word symbols which do not have the default erased value. After the page read, if the number of code word symbols not equal to the default erased value exceeds the maximum number of symbol errors correctable by the ECC, then the apparatus declares that the read page is a written page. Otherwise, the apparatus declares that the read page is unwritten.

DETAILED DESCRIPTION OF PREFERRED EMBODIMENTS

Figure 1:
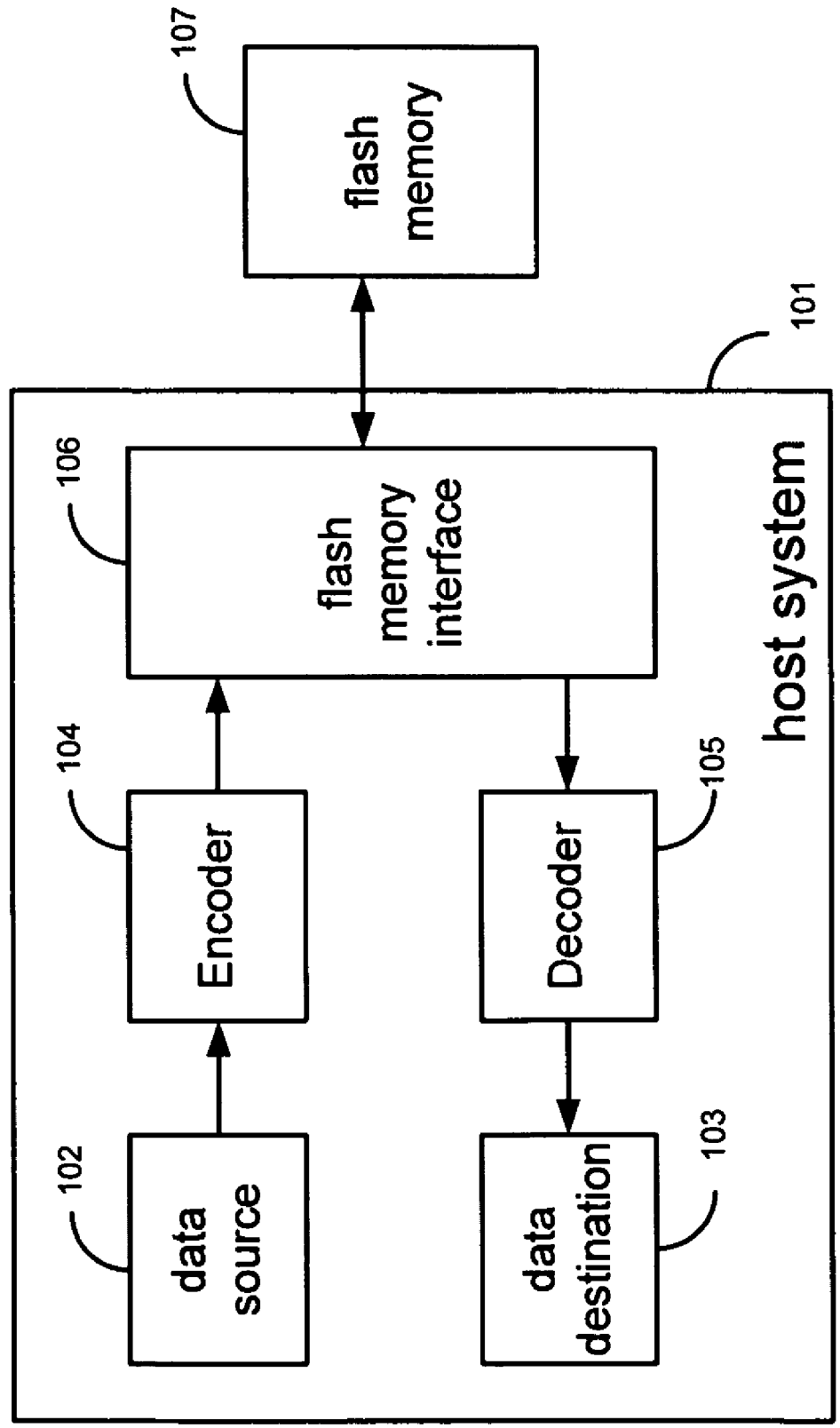
FIG. 1 illustrates an overview of a generalized ECC scheme in a host system which employs flash memory as storage medium.
Figure 2:
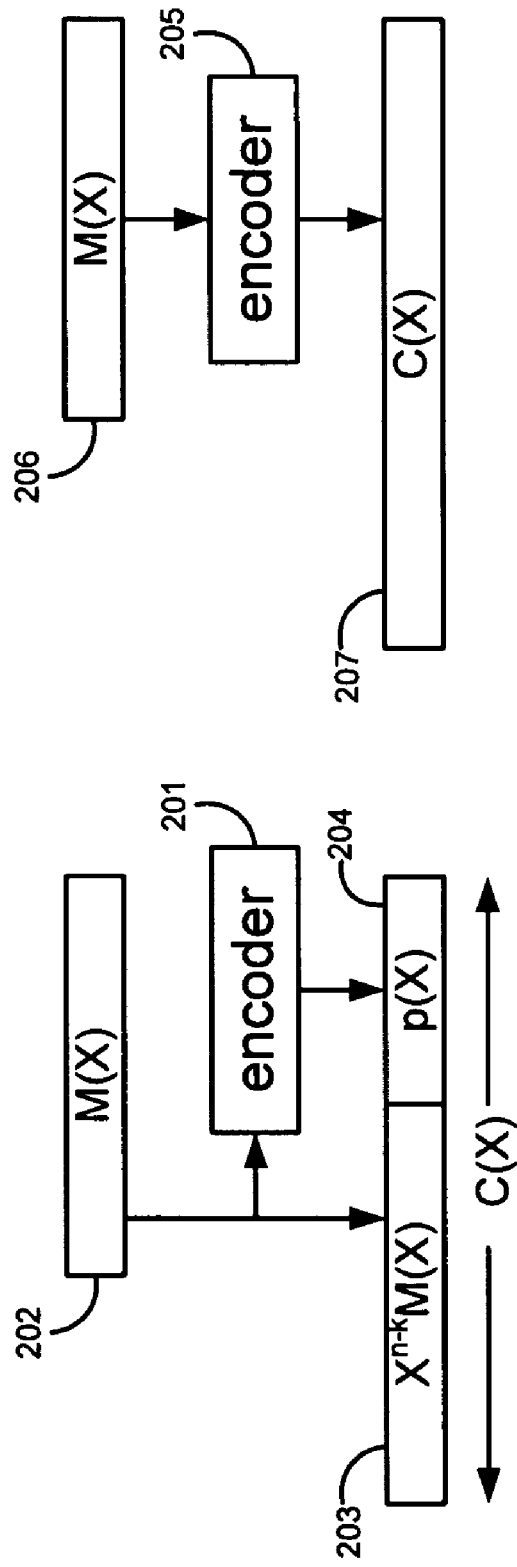
FIG. 2 illustrates a mathematical view of the systematic and non-systematic encoding methods.
Figure 3:
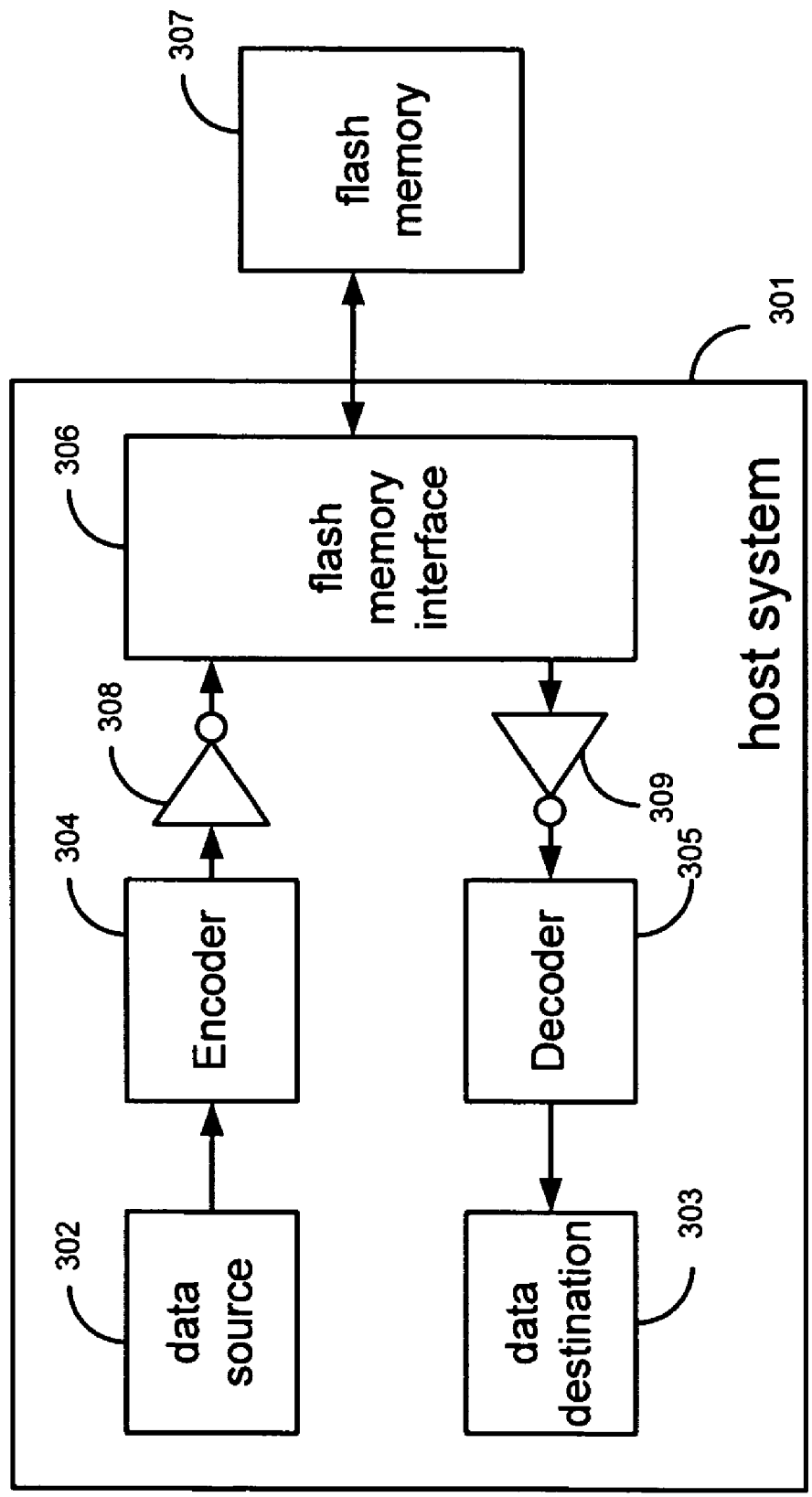
FIG. 3 illustrates the ECC scheme of the first embodiment.

The first embodiment presents an ECC scheme which provides ECC protection over unwritten pages and is described as follows. In the first embodiment, either a systematic encoder or a nonsystematic encoder may be used. As illustrated in FIG. 3, a logic inverter (308) is placed after the output of the encoder (304) and another logic inverter (309) is placed before the input of the decoder (305). In a page write, all bits of the ECC code word are logically inverted as they are sent to the flash memory (307). In a page read, all bits of the read ECC code word are logically inverted again before they enter the decoder.

For written pages, the effects of the two inverters cancel each other out as if these two inverters do not exist in the ECC scheme. However, when the host reads from an unwritten page, the inverter (309) causes the decoder (305) to receive read data in the bitwise complement of the default value, except for the bits altered by bit errors. In other words, the decoder receives all-zero data with bit errors appearing as bits of value one. Since with linear block codes, all-zero data always form a valid code word, the decoder is able to perform ECC decoding on the data read from an unwritten page and detect and correct bit errors as long as the number of bit errors in each code word is within the capability of the ECC.

With this ECC scheme, unwritten pages are decoded in the same way as written pages and are thus under the protection of ECC against data corruptions.

The second embodiment presents another ECC scheme which provides ECC protection over unwritten pages and is described as follows. In the second embodiment, a systematic encoder is used such that each code word consists of a message section and a parity section, whereby the parity is computed by the encoder using the message as input. Once the linear block code for the ECC is specified, the parity for a particular message is specified and can be pre-computed. The parity based on a message, all of whose bits are one, is pre-computed and is hereafter referred to as the "Default Parity" (or DP). The bitwise complement of the DP is hereafter referred to as the "Default Parity Complement" (or DPC). Thus, the XOR of the DP and the DPC results in bits of all ones. In a page write, as each code word is sent to the flash memory, the parity section of the code word is bitwise XORed with the DPC. In a page read, the parity section of each code word is again bitwise XORed with the DPC before entering the decoder. With this ECC scheme, data read from an unwritten page appear to the ECC decoder as a valid code word where all bits of the message are one when bit errors are absent.

Figure 4:
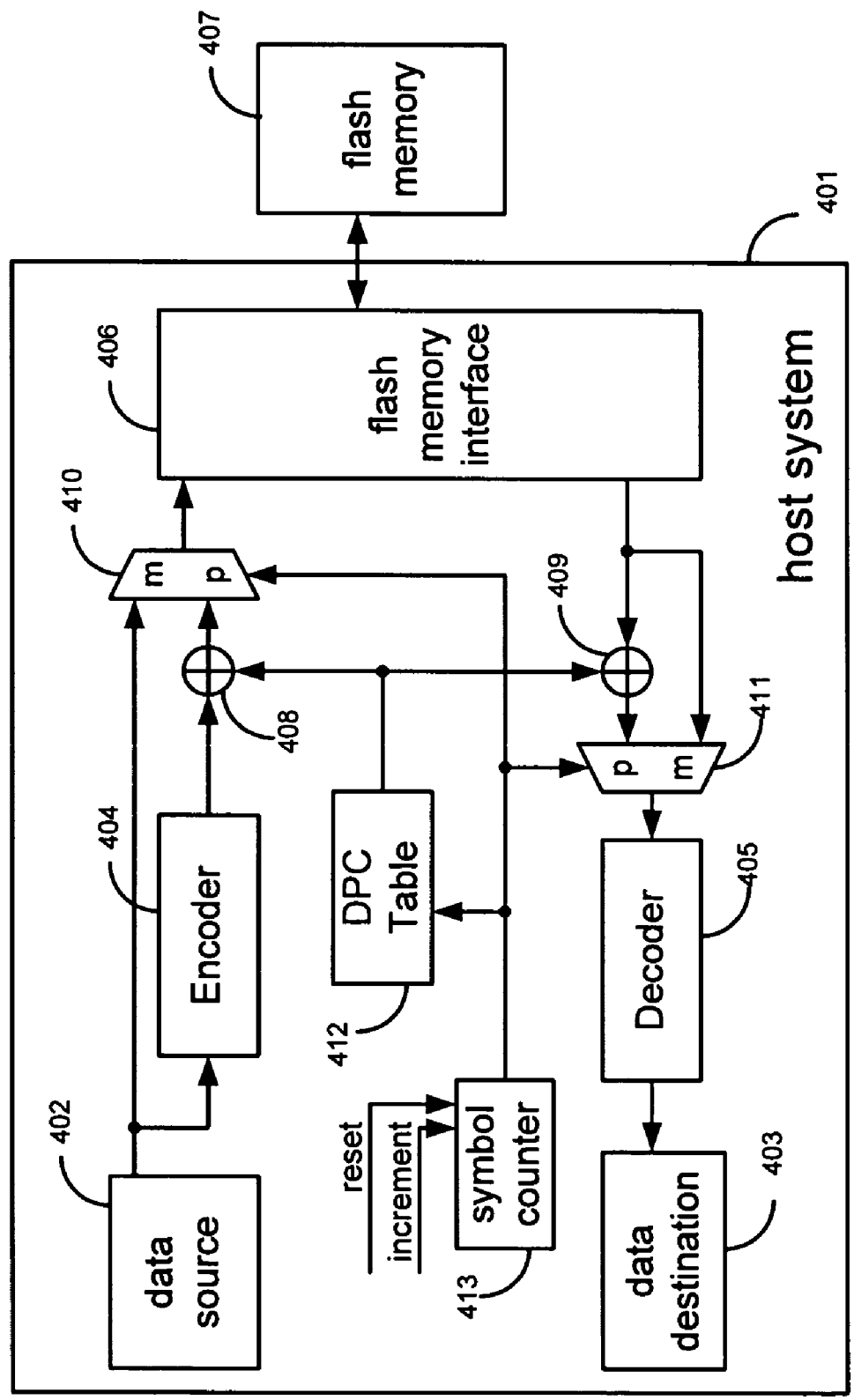
FIG. 4 illustrates the ECC scheme of the second embodiment.

FIG. 4 illustrates the second embodiment. The Symbol Counter (413) maintains a count which indicates which symbol of the code word is being transferred to and from the flash memory. For example, the Symbol Counter may be reset to zero via a reset signal at the beginning of a page write or a page read, and incremented by one via an increment signal for each symbol transferred. The DPC Table (412) contains the pre-computed DPC. The DPC Table takes the output of the Symbol Counter as input and outputs a symbol of DPC according to the value of the Symbol Counter. More specifically, when the Symbol Counter indicates that the parity symbols of a code word are being transferred, the DPC Table outputs a corresponding DPC symbol for each parity symbol being transferred. Each symbol output by the DPC Table is added (bitwise XORed) to the output symbol of the Encoder by Adder (408) and to the symbol read from the flash memory by Adder (409). The ECC scheme further employs two multiplexers (410, 411) to control the data flow to/from the flash memory, whereby both multiplexers have their select inputs coupled to the Symbol Counter. In a page write, based on the Symbol Counter output, the multiplexer (410) selects the message (at the "m" input) while the message section of each code word is being sent to the flash memory and selects the output of the Adder (408) (at the "p" input) while the party section of the code word is being sent to the flash memory. Similarly in a page read, the multiplexer (411) selects the unaltered flash memory data (at the "m" input) when the message section is being transferred, and selects the output of the Adder (409) (at the "p" input) when the parity section is being transferred.

In a page write, the message output by the data source (402) is sent to the multiplexer (410) which passes the message to the flash memory interface (406), while the encoder (404) takes the message as input and computes the parity of the code word. After the message section has been transferred, the encoder (404) begins to output the parity section while the multiplexer (410) now passes the parity section to the flash memory interface. As each parity symbol is output by the encoder, the Adder (408) adds a corresponding DPC symbol to the parity symbol. Therefore, the message section that is sent to the flash memory comes directly from the data source (402) unaltered, while the parity section that is sent to the flash memory is the result of a bitwise XOR of the parity computed by the encoder and the DPC. In the special case where the message bits are all ones, the parity output by the encoder is the DP which, after being XORed with the DPC, results in a parity section where all bits are ones. As a consequence, both the message section bits and the parity section bits sent to the flash memory are all ones, and thus this code word contains the default value of an unwritten page when bit errors are absent.

In a page read, as selected by the multiplexer (411), the message section of the code word is directly sent to the Decoder (405) unaltered, while the parity section is bitwise XORed with the DPC by the Adder (409) before entering the Decoder (405).

Figure 5:
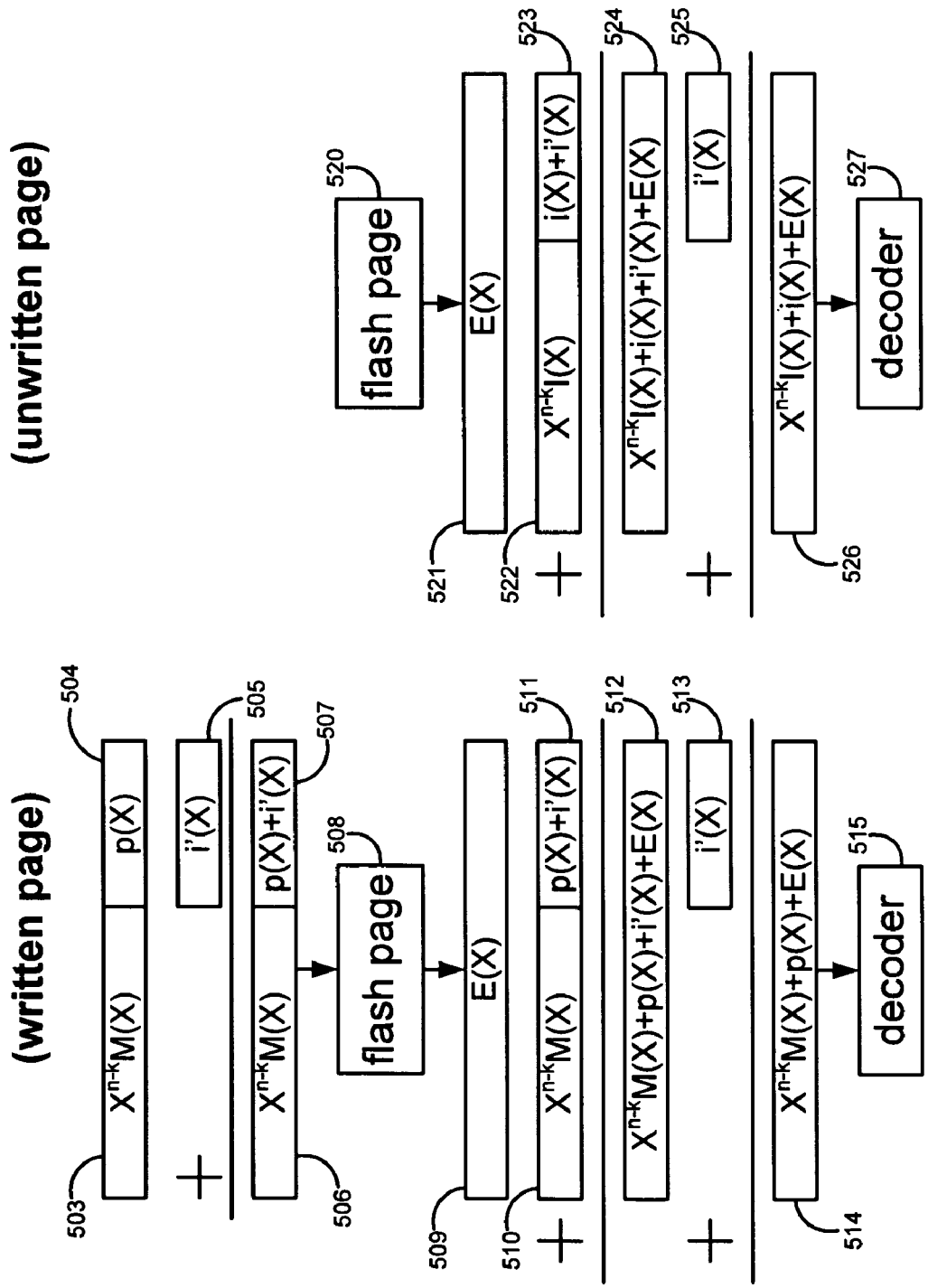
FIG. 5 illustrates a mathematical view of the data flow in the ECC scheme of the second embodiment.

FIG. 5 illustrates the second embodiment of the ECC scheme from a mathematical viewpoint. Let I(X) represent the message of the special case where all its bits are ones, and let i(X) and i'(X) represent the DP and the DPC, respectively. In a page write, a code word represented by $C(X)=[X^{n-k}M(X)+p(X)]$ (503, 504) is added by i'(X) (505) where the sum $[X^{n-k}M(X)+p(X)+i'(X)]$ (506, 507) is written to the page (508). When reading this page, bit errors may corrupt the originally written code word. The effect of data corruption is modeled by adding an error pattern represented by E(X) (509) to the original code word (510, 511). Therefore, the code word read from flash memory is $[X^{n-k}M(X)+p(X)+i'(X)+E(X)]$ (512), which is then added by i'(X) (513), where the sum $[X^{n-k}M(X)+p(X)+E(X)]$ (514) is sent to the Decoder (515). Consequently, the Decoder (515) performs decoding on $[X^{n-k}M(X)+p(X)+E(X)]$, whereby $[X^{n-k}M(X)+p(X)]$ is a valid code word.

An unwritten page contains data of default value where all bits are ones when bit errors are absent. Therefore data in an unwritten page can be represented by $[X^{n-k}I(X)+i(X)+i'(X)]$ (522, 523). When reading an unwritten page, the effect of data corruption is modeled by adding an error pattern represented by E(X) (521) to the default data (522, 523), such that the read data is $[X^{n-k}I(X)+i(X)+i'(X)+E(X)]$ (524), which is then added by i'(X) (525), where the sum $[X^{n-k}I(X)+i(X)+E(X)]$ (526) is sent to the Decoder (527). As a result, the Decoder (527) performs decoding on $[X^{n-k}I(X)+i(X)+E(X)]$, whereby $[X^{n-k}I(X)+i(X)]$ is a valid code word.

With this ECC scheme, the unwritten pages are decoded in the same way as written pages and are thus under the protection of ECC against data corruptions.

The second embodiment describes an exemplary scenario where one code word symbol is transferred to/from the flash memory in each transfer cycle. In cases where M code word symbols are transferred to/from the flash memory in each transfer cycle, whereby M>1, the exemplary scenario may be modified such that, for each M symbols transferred, the Symbols Counter (413) increments by M, the DPC Table (412) outputs M corresponding symbols of the DPC, while the two Adders (408, 409) each performs a bitwise XOR of two sets of M symbols.

The present invention further provides an apparatus for determining whether or not a page is unwritten after a page read is performed. The apparatus is named the "Unwritten-Page Detector", hereafter referred to as the "UP Detector", and is described as follows.

To simplify the description, it is used as an example that each data word read from the flash memory happens to be an ECC symbol. For example, a flash memory with an 8-bit data bus on its interface outputs a data word of 8 bits in each read cycle, while the ECC symbol size is also 8 bits. Hereafter, the terms "data word" and "symbol" are used interchangeably. The principles described in the present invention may easily be extended to applications where the flash memory data word is of a different size from an ECC symbol. Further, the host may store one or more ECC code words in each page. For simplicity, it is used as an example that each page stores one ECC code word. In other words, reading/writing one flash memory page is equivalent to reading/writing one code word. It is obvious to those skilled in the art that the same principles still apply where multiple ECC code words are stored in each page and/or where multiple pages are used to store one ECC code word.

Figure 6:
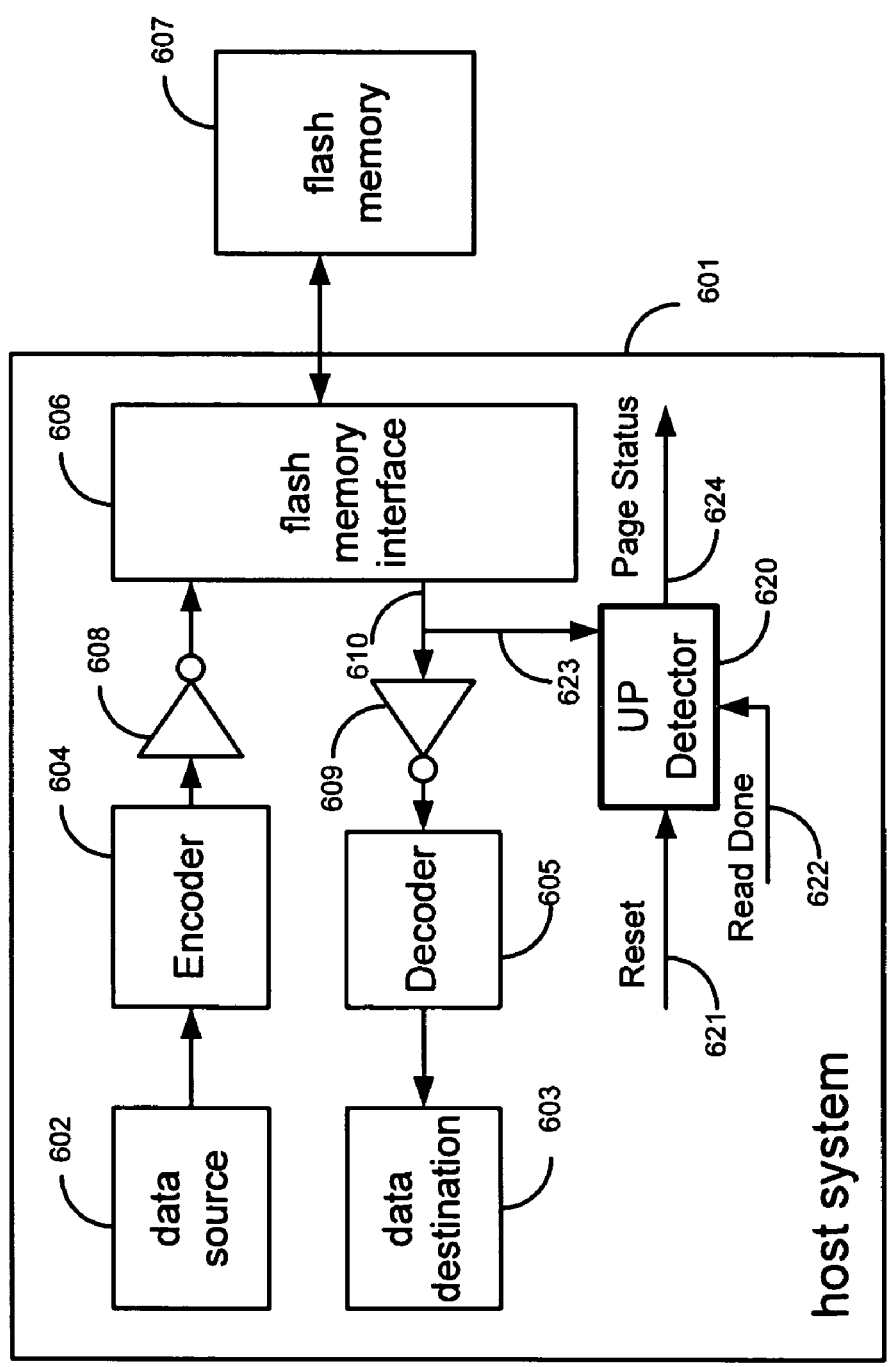
FIG. 6 illustrates an overview of the UP Detector residing in a host system which employs the ECC scheme of the first embodiment.
Figure 7:
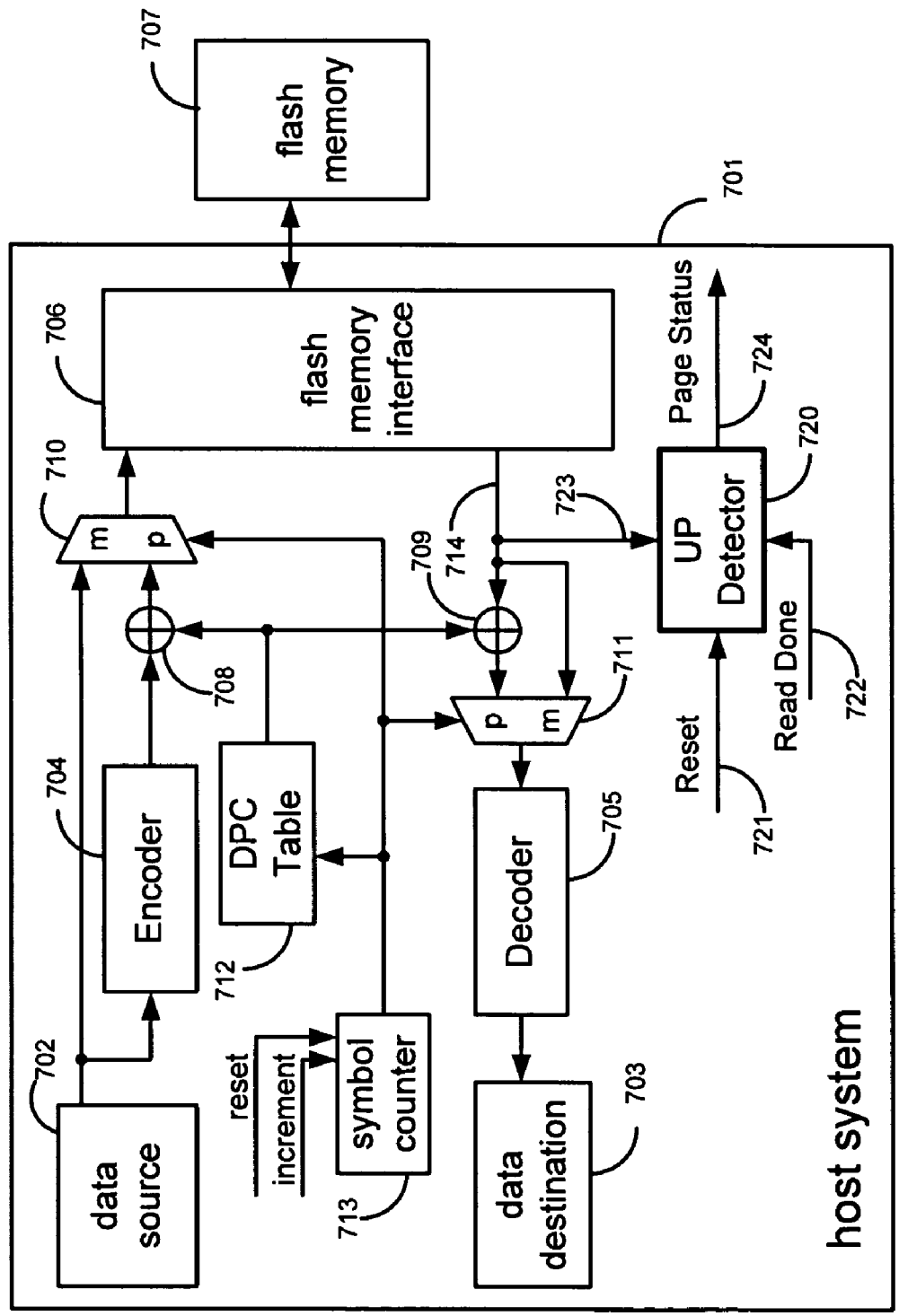
FIG. 7 illustrates an overview of the UP Detector residing in a host system which employs the ECC scheme of the second embodiment.

Preferably, the UP Detector resides in a host system where ECC protection covers unwritten pages such that the probability of the UP Detector making a false decision is minimized. FIG. 6 illustrates an example where the UP Detector resides in a host system which adopts the ECC scheme of the first embodiment of the present invention, while FIG. 7 illustrates an example where the UP Detector resides in a host system which adopts the ECC scheme of the second embodiment of the present invention. However, any ECC scheme which provides ECC protection over unwritten pages may be employed along with the UP Detector.

As illustrated in FIG. 6 and FIG. 7, the UP Detector (620, 720) is coupled to the read data path (610, 714) via the "Symbol" signal (623, 723), whereby each data word read from the flash memory is tapped off the read data path and sent to the UP Detector by the Symbol signal (623, 723). The UP Detector is further coupled to a "Reset" signal (621, 721), a "Read Done" signal (622, 722), both of which are controlled by the host system, and a "Page Status" signal (624, 724) which is readable to the host system. In FIG. 6, the UP Detector (620) takes the read data (610) before of the inverter (609) such that a data word read from an unwritten page would have the default value when bit errors are absent. It is obvious that the UP Detector may alternatively take the read data after the inverter (609) such that a data word read from an unwritten page would have all its bits being inverted to zeros before entering the UP Detector. In the latter case, the theory of operation described in the present invention still applies, except the UP Detector would operate on an inverted logic.

A symbol which does not have the default value of an unwritten page, is referred to as a "Non-Default Symbol", or an "ND Symbol". In other words, a symbol which has at least one bit of zero is an ND Symbol. In a page read, the UP Detector counts the number of ND Symbols in the received code word as the page is read from the flash memory. After the page read, if the number of ND Symbols in the received code word is less than or equal to T, whereby T is the maximum number of erroneous symbols correctable by the ECC in a code word, then the UP Detector concludes that all bits of zero in the read code word had been flipped from bits of one by bit errors correctable by the ECC decoder, and that all bits of one have been read correctly. Thus the UP Detector declares that the read page is unwritten. This conclusion is based on the fact that, for linear block codes, a received code word that is within Hamming Distance of T from a valid code word will be corrected by the decoder to the valid code word. On the other hand, if the number of ND Symbols is greater than T, then the UP Detector declares that the read page is written.

Figure 8:
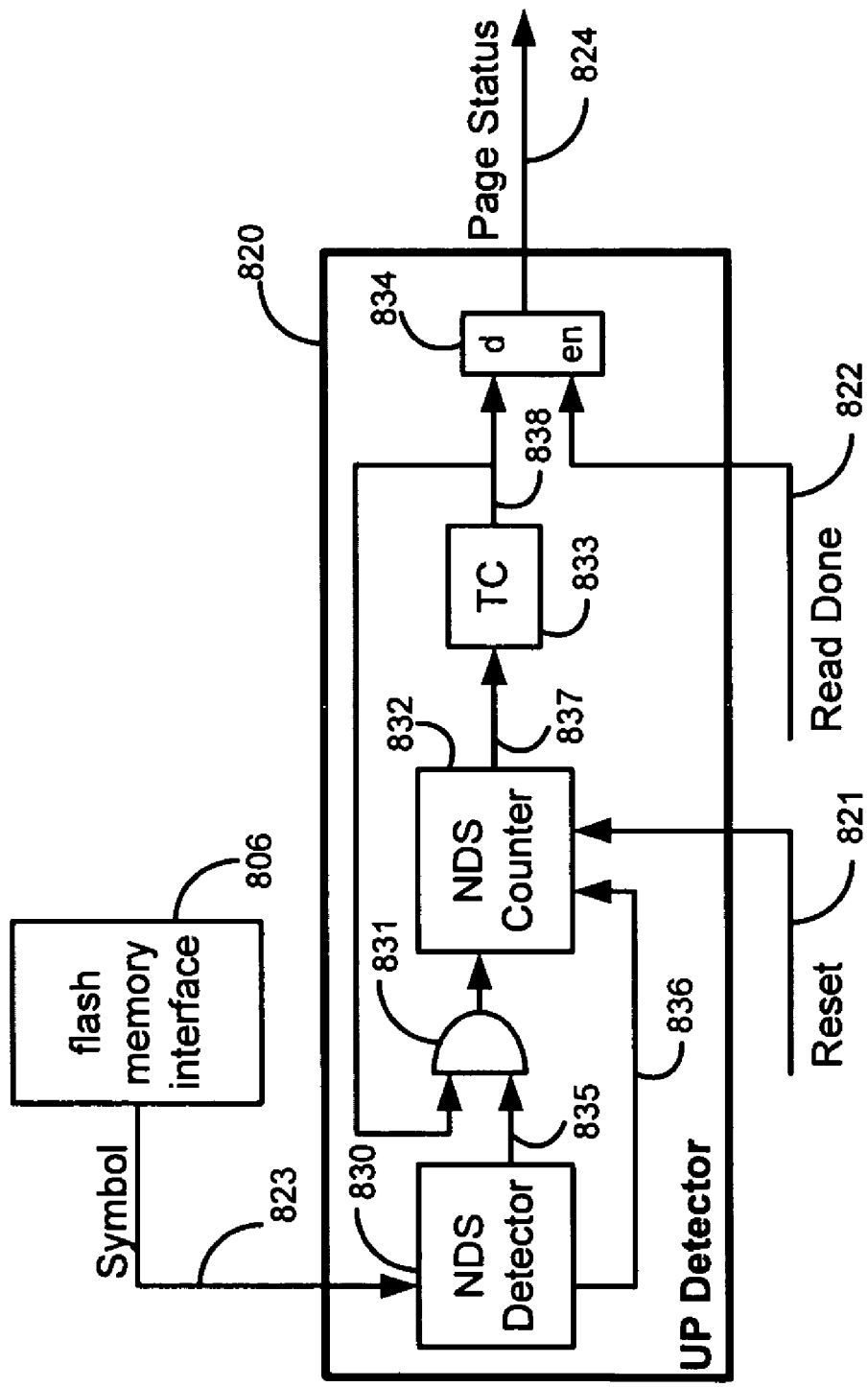
FIG. 8 illustrates a more detailed view of the UP Detector for a host system which stores one ECC code word in each flash memory page.

FIG. 8 illustrates a more detailed view of the UP Detector. The signals via which the UP Detector is coupled to the host system, namely "Reset", "Read Done", "Symbol" and "Page Status" are labeled with reference numbers (821, 822, 823 and 824), respectively, in FIG. 8. The UP Detector comprises a "Non-Default Symbol Detector" (or NDS Detector) (830), an AND gate (831), a "Non-Default Symbol Counter" (or NDS Counter) (832), a "T Comparator" (or TC) (833), and a "Page Status" register (834). The TC compares the output (837) of the NDS Counter to the integer T and outputs either a binary one on signal (838) if the NDS Counter output is less than or equal to T or a binary zero otherwise. The NDS Detector takes the Symbol signal as input and determines whether each symbol input via the Symbol signal is an ND Symbol and, if so, outputs a one on the binary signal "ND Symbol Detected" (or NDS Detected) (835). If the input symbol is not an ND Symbol, then the NDS Detected signal stays zero. The AND gate has its two inputs coupled to the TC output (838) and the NDS Detected signal (835), respectively, and its output coupled to the NDS Counter. The NDS Counter is a counter which is initialized to zero by the Reset signal and incremented by the AND gate output being one. The Page Status register latches the value of the output of TC when enabled by the Read Done signal and has its output coupled to the Page Status signal (824).

Before each page read, the host asserts the Reset signal (821) to initialize the NDS Counter to zero. With NDS Counter being zero, which is less than T, the TC outputs a binary one on signal (838) which causes the AND gate to pass the value of the NDS Detected signal (835) to the NDS Counter, whereby the NDS Counter is incremented by one when the NDS Detected signal is a binary one.

During a page read, each code word symbol read from the flash memory is input to the NDS Detector via the Symbol signal. For each ND Symbol detected by the NDS Detector, the NDS Detected signal is pulsed to binary one which increments the NDS Counter by one. As the page read progresses, if and when the NDS Counter reaches a value above T, then the TC output (838) becomes zero which forces the AND gate to output a zero and prevents the NDS Counter from being incremented by the NDS Detected signal until the Reset signal is asserted again.

At the end of a page read, if the TC output (838) is zero, then it can be concluded that the NDS Counter has reached a value greater than T, which means that the NDS Detector has encountered more than T ND Symbols. In this case, the UP Detector declares the read page as "written". On the other hand, if the TC output (838) is one, then it can be concluded that the NDS Counter is less than or equal to T, which means that the NDS Detector has encountered no more than T ND Symbols. In this case, the UP Detector declares the read page as "unwritten". After a page read is complete, the host asserts the Read Done signal which enables the Page Status register to latch the TC output. The Page Status register outputs the latched value to the Page Status signal (824) for the host system to read. The Page Status signal being a one indicates that the read page is unwritten. Otherwise, the read page is written. The value of the Page Status signal for a read page is valid until the host asserts the Read Done signal again after the next page read is complete.

The following are several points worth noting in using the UP Detector.

When the ECC scheme of the first embodiment is used by the host to provide ECC protection to unwritten pages, the UP Detector can not distinguish an unwritten page from a page written with a code word based on an all-zero message. In linear block codes, a code word based on an all-zero message is an all-zero code word, which is bitwise inverted to be all-one before being written to the flash memory page and appears exactly the same as an unwritten page to the UP Detector. In this case, pages which have been written with the ECC code word based on an all-zero message are also declared as unwritten by the UP Detector.

When the ECC scheme of the second embodiment is used by the host to provide ECC protection to unwritten pages, the UP Detector can not distinguish an unwritten page from a page written with a code word based on an all-one message. In the second embodiment, when the host writes all-one message to a page, both the message section and the parity section of the page are written with bits of value one, which appears exactly the same as an unwritten page to the UP Detector. In this case, pages which have been written with the ECC code word based on an all-one message are also declared as unwritten by the UP Detector.

Further, with either embodiment of the ECC scheme, there are scenarios where the UP Detector makes a false decision as to whether a read page is written. One such scenario is when an unwritten page is read with a number of symbol errors which exceeds T. In this scenario, the UP Detector would falsely declare the unwritten page as written. Another scenario is when a written page is read with an error pattern which causes the received code word to be, in terms of Hamming Distance, within T symbols to an all-zero code word if the ECC scheme of the first embodiment is used, or within T symbols to a code word of an all-one message if the ECC scheme of the second embodiment is used. In this scenario, the UP Detector would falsely declare a written page as unwritten.

Although the description of the exemplary UP Detector above uses the scenario where each data word read from the flash memory is of the same size as an ECC code word symbol, the same principles may be applied to scenarios where the read data word is of a different size from the ECC code word symbol. For example, if each read data word contains M symbols where M>1, then the UP Detector may be constructed such that the NDS Detector not only detects if there is any ND Symbol in the read data word, but also counts the number of ND Symbols in each data word and sends said number to the NDS Counter via signal "NDS Count" (836 in FIG. 8). For each read data word which contains at least one ND Symbol, the NDS Counter is incremented by the value of NDS Count.

Figure 9:
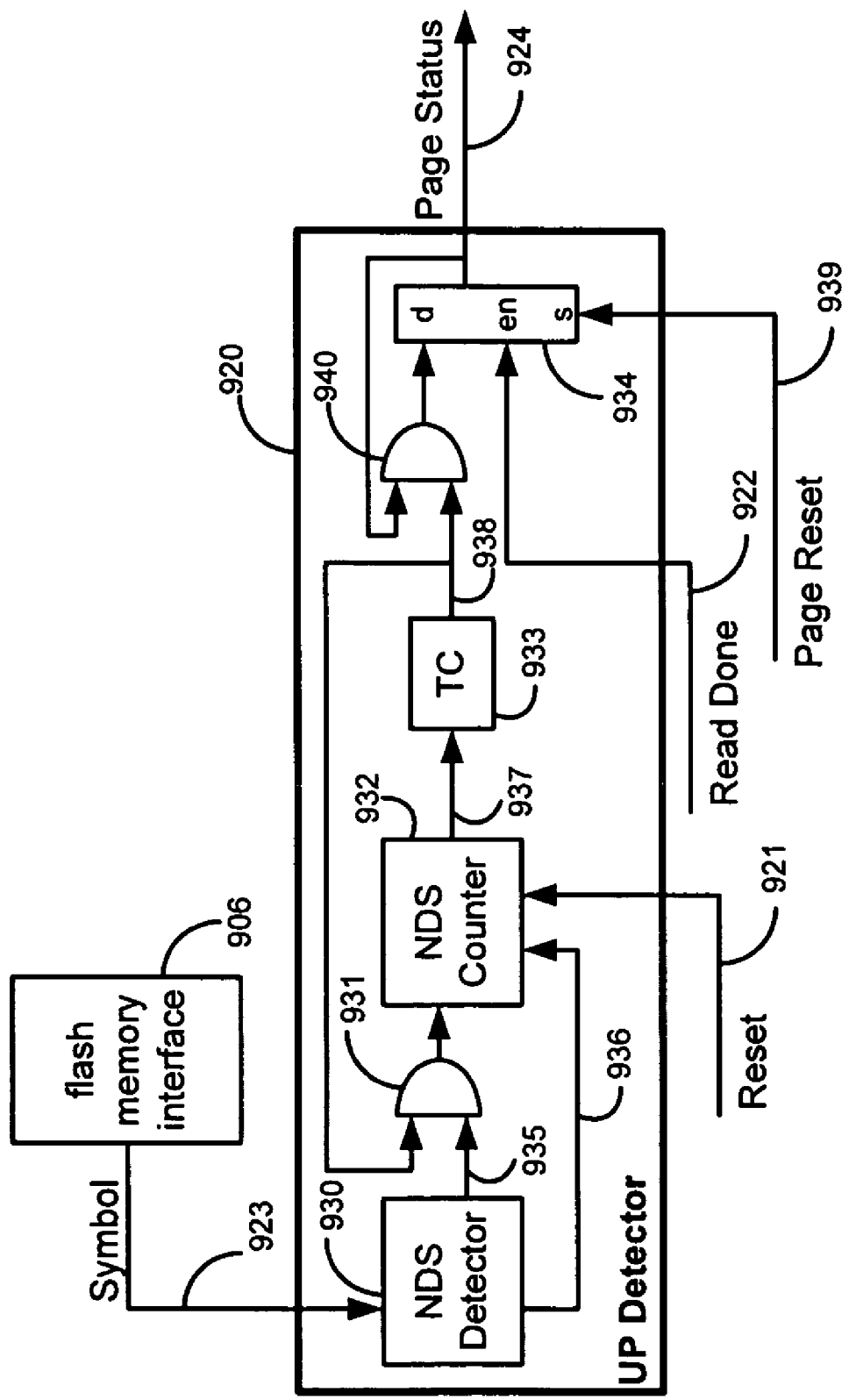
FIG. 9 illustrates a more detailed view of the UP Detector for a host system which stores more than one ECC code word in each flash memory page.

Further, the exemplary UP Detector described above may be modified to accommodate scenarios where each flash memory page stores more than one ECC code word, as illustrated in FIG. 9. The host asserts the Reset signal (921) to initialize the NDS Counter (932) to zero before each code word is read from the flash memory page. The host asserts the Read Done signal (922) to enable the Page Status register (934) to latch its input after each code word is read from the flash memory. The UP Detector further provides an input signal "Page Reset" (939) coupled to the Page Status register (934), whereby the host asserts the Page Reset signal to initialize the Page Status register to a binary one before each page read. The UP Detector further comprises an AND gate (940) with its two inputs coupled to the TC output (938) and the Page Status signal (924) and its output coupled to the Page Status register. Before a page read begins, the Page Status register is initialized to one by the Page Reset signal, which causes the AND gate (940) to pass the TC output (938) to the Page Status register. As the page read progresses, if and when the TC outputs a binary zero for a read code word, the Page Status register would latch a binary zero, which in turn causes the AND gate to keep the Page Status register in the value of zero regardless of the TC output for the rest of the page read until the Page Reset signal is asserted again before the next page read. In this case, the Page Status signal (924) is valid after a page read until the Page Reset is asserted before the next page read.

What is claimed is:

1. A method for providing error correction coding (ECC) by a host system which employs flash memory, wherein bits in a flash memory page which has been erased but has not been programmed have the default value of one, wherein the code used as the ECC is a linear block code, the method comprising steps:
   a) encoding user data into encoded data by using an ECC encoder;
   b) inverting all bits of the encoded data, wherein the inverted encoded data are transferred to the flash memory to be stored therein;
   c) inverting all bits of data read from the flash memory; and
   d) decoding the inverted read data to attempt to restore user data by using an ECC decoder,
wherein steps a) and b) of said method may optionally be omitted when the host system reads a flash memory page which has not been programmed since the last erasure of said page.

2. A method for providing error correction coding (ECC) by a host system which employs flash memory, the method comprising steps:
   a) encoding user data into encoded data by using a systematic ECC encoder, wherein said encoder encodes each section of user data into an ECC code word comprising said section of user data and a parity section;
   b) performing a first bitwise exclusive OR of the parity section of each ECC code word with a pre-computed bit sequence, wherein the message section of said ECC code word and the result of said first exclusive OR are transferred to the flash memory to be stored therein;
   c) performing a second bitwise exclusive OR of the parity section of each ECC code word read from the flash memory with the same pre-computed bit sequence as in step b); and
   d) decoding each read ECC code word whose message section is read from the flash memory unaltered and whose parity section is the result of said second bitwise exclusive OR to attempt to restore the user data by using an ECC decoder.

3. The method as defined in claim 2, wherein the pre-computed bit sequence is the bitwise complement of the parity section of the ECC code word whereby all bits in its message section have the value of one.

4. The method as defined in claim 2, wherein bits in a flash memory page which has been erased but has not been programmed have the default value of one, wherein the code used as the ECC is a linear block code.

5. The method as defined in claim 2, wherein said steps
   a) and b) are omitted when the host system reads a flash memory page which has not been programmed since the last erasure of said page.

6. An apparatus residing in a host system which employs flash memory and error correction coding (ECC) for protecting data stored therein, wherein the apparatus determines whether a read flash memory page has been programmed since the last erasure of said page, the apparatus comprising:
   a detector unit configured to receive from the host system data words read from a flash memory page and to count and output the number of non-default symbols contained in each data word, wherein a non-default symbol is a symbol whose value is different from the default value of a symbol in an erased flash memory page;
   a counter unit coupled to the detector unit and configured to accumulate and output the number of non-default symbols in each read data word output by the detector unit, wherein the counter unit may be initialized to zero when it is reset;
   a comparing unit coupled to the counter unit and configured to output either a first binary value if the output of the counter unit is less than or equal to an integer T, or a second binary value if the output of the counter unit is greater than said integer T, wherein said first binary value and said second binary value are different; and
   a register unit coupled to the comparing unit and configured to be initialized to said first binary value when it is reset, to latch the output of the comparing unit when it is enabled, and to retain its content once its content becomes said second binary value even when it is enabled until it is reset, wherein the output of the register unit is coupled to a status signal readable by the host system.

7. The apparatus as defined in claim 6, wherein said integer T is the maximum number of symbol errors correctable by the ECC employed by said host system.

8. A method for the host system to operate the apparatus as defined in claim 6, the method comprising steps:
   a) resetting the register unit before reading a flash memory page;
   b) resetting the counter unit before reading each ECC code word from said page;
   c) reading an ECC code word from said page and inputting each data word read from said page to the detector unit;
   d) enabling the register unit to latch the output of the comparing unit;
   e) checking whether all ECC code words stored in said page have been read and, if so, moving to step f), otherwise, repeating steps b), c) d) and e);
   f) determining whether said page has been programmed since its last erasure by reading the status signal, wherein it is determined that said page has not been programmed if the status signal indicates said first binary value, wherein it is determined that said page has been programmed if the status signal indicates said second binary value.

* * * * *